Feb. 10, 1970   W. TUTTLE   3,494,178
LEAK TESTING METHOD AND APPARATUS
Filed March 11, 1968
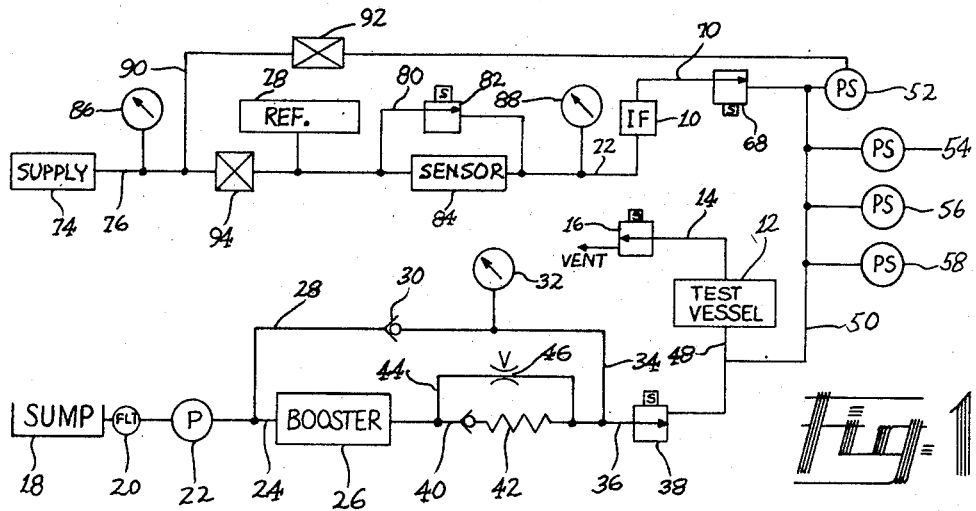
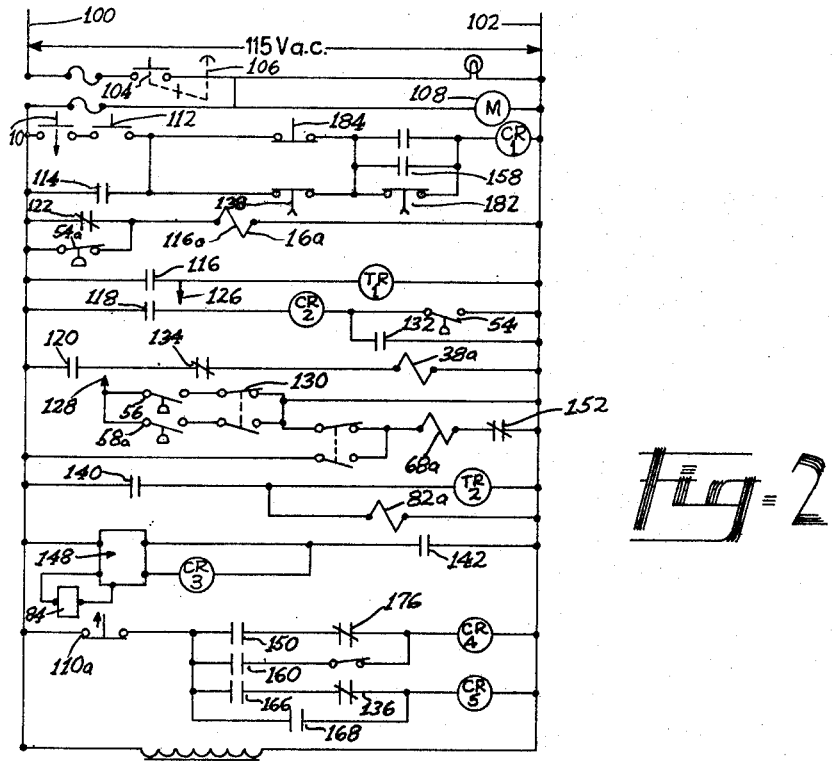
INVENTOR/S
WAINWRIGT TUTTLE,
BY *Melville, Strasser, Foster and Hoffman*
ATTORNEYS United States Patent Office 3,494,178
Patented Feb. 10, 1970

3,494,178
LEAK TESTING METHOD AND APPARATUS
Wainwright Tuttle, Cincinnati, Ohio, assignor to Spati Industries, Inc., Covington, Ky., a corporation of Kentucky
Filed Mar. 11, 1968, Ser. No. 712,106
Int. Cl. G01m 3/04
U.S. Cl. 73—49.2
16 Claims

ABSTRACT OF THE DISCLOSURE

This invention provides an apparatus for non-destructive testing of fluid vessels. The vessel is filled by a liquid pressure system with a liquid under pressure. By means of a gas pressure system, pressure is applied to this liquid through an elastomer interface unit which separates the gas and liquid systems. With the systems pressurized and isolated, leakage of the liquid from the vessel will be indicated by a change in pressure in the gas pressure system.

BACKGROUND OF THE INVENTION

This invention relates to the leak testing of products by means of liquid under pressure (generally known in the art as hydrostatic testing) and to flow testing with liquids.

More specifically, it relates to a device for sensing a very small change in the quantity of pressurized fluid in a vessel being tested, in order to detect and/or measure the magnitude of a leak or flow in a product.

Hydrostatic testing has been considered desirable by the prior art for various reasons. In the first place, these systems are generally safer than gas testing systems because a failure of the object under test does not result in the release of a large amount of stored energy. Furthermore, where the object or vessel being tested is to be used with liquids, liquid testing is more closely related to the actual conditions to be encountered in service.

In addition, liquid testing in certain cases is required by trade associations, codes, insurance associations or customers.

In some cases, it is convenient to combine leak testing with liquid flushing or cleaning, or with adjusting, inspecting, sorting, or calibrating operations employing liquid.

Generally considered, the usual method of leak testing with liquid is to fill the vessel being tested with liquid under pressure and visually observe the appearance of liquid emerging from the vessel. This method has numerous disadvantages including:

(1) It requires close attention by the operator and the usually awkward difficulty of observing all surfaces equally well.

(2) It requires lengthy observation to permit the accumulation of enough liquid from a leak to be visually observable.

(3) Where a leakage path is small and long, and particularly where a small leakage path leads through a larger cavity, even a fairly large leak may not be observed within the permitted test time.

(4) In many products, it is not possible to vent all the air when filling with liquid. If a leak is in the area occupied by trapped air, the leaking air will not be observed.

Another hydrostatic testing method contemplates filling the vessel being tested with liquid under pressure and isolating the pressurized vessel, so that the pressurized liquid is trapped therein. This in turn is connected to a pressure measuring instrument, and a drop in pressure would indicate a leak. This method has the disadvantages that:

(1) Leak indication sensitivity varies very greatly with the variation of the amount of gas trapped therein and with the elasticity of the object.

(2) Even when the elasticity is low and the amount of trapped air is negligible, the test is greatly affected by any slight temperature change unless the volumetric thermal expansion of the liquid is identical with that of the object.

(3) When a sensitive leak indication is desired in the presence of unavoidable trapped air, a long period of tests is required.

SUMMARY OF THE INVENTION

This invention contemplates, in its broadest aspect, a gas circuit system, a liquid circuit system adapted to removably include a vessel to be tested, and an interface unit separating the gas and liquid circuit systems.

The interface unit is basically a hollow body with which both the gas and liquid circuit systems communicate, and having an elastomer mounted therein for separating the two systems.

The liquid circuit system includes means for substantially filling a vessel to be tested with liquid under pressure. During the test cycle, a change of volume of liquid in the liquid circuit system will be communicated through the interface unit to the gas circuit system without appreciable loss of sensitivity. The gas circuit system includes a sensor arranged to detect a very small change in gas pressure, quantity, or a flow therein.

It is a principal object of the invention to provide a method and apparatus which permits sensitive, accurate and rapid leak testing of objects employing mostly liquid under pressure as the test medium.

It is another object of the invention to provide a method and apparatus for leak testing with liquid wherein the acceptance level is not dependent upon human observation or judgment.

A further object of the invention is to provide a method and apparatus wherein the sensitivity and reliability of leak testing is substantially unaffected by the amount of trapped gas in the vessel being tested or by minor ambient temperature changes.

Another important object of the invention is the provision of a method and apparatus for the leak testing by instrument sensing of fluid loss without a loss of sensitivity substantially proportional to the volume of the product as with gas loss testing.

A further object of the invention is to provide a method and apparatus capable of detecting a leak in the area of the gas trapped in the vessel being tested.

BRIEF DESCRIPTION OF THE DRAWING

FIGURE 1 is a fluid schematic drawing showing an exemplary embodiment of the invention.

FIGURE 2 is an electrical schematic drawing showing an exemplary control system for the method and apparatus of this invention.

DESCRIPTION OF THE PREFERRED EMBODIMENT

Referring now to FIGURE 1, the interface unit is indicated at 10. As indicated earlier, the interface unit 10 is essentially a hollow body having an elastomer mounted therein. The liquid circuit system to be described presently communicates with the interface unit on one side of the elastomer, while the gas circuit system, also to be described presently, communicates with the interface unit on the other side of the elastomer. The elastomer therefore serves to separate the gas and liquid circuit systems, and as will be described, serves to transmit a change in volume in the liquid circuit system to the gas circuit system.

The vessel to be tested is indicated schematically at 12. It will be understood that suitable mounting means, not forming a part of this invention will be provided so that the liquid circuit system to be described can removably include the vessel 12.

In the embodiment shown, the test vessel or more accurately the mounting means for the test vessel is provided with the vent passage 14 including the normally closed solenoid valve 16.

The arrangement for substantially filling the test vessel with liquid under pressure includes the sump 18, the filter 20, and the pump 22 all connected by suitable conduits. The output of the pump 22 communicates via the conduit 24 with the high pressure booster 26, and via the conduit 28, past the check valve 30, pressure gauge 32 and conduits 34 and 36 with the solenoid operated, normally-closed main water valve 38.

The output of the booster communicates via the conduit 40 with the spring biased check valve 42, with the conduit 36 and main water valve 38. The by-pass conduit 44 includes the needle valve 46, and also communicates via the conduit 36 with the main water valve 38.

The output of the main water valve 38 communicates with the test vessel or the mounting means for including the test vessel 12.

The conduit 48 via the branch conduit 50 communicates with the pressure switches 52, 54, 56, and 58, and with the normally closed, solenoid operated separation valve 68. The separation valve 68 communicates via the conduit 70 with the interface unit 10.

The gas circuit system communicates with the other side of the interface unit via the conduit 72, and includes a supply of gas under pressure 74, which via the conduit 76 supplies the system with gas under pressure. The conduit 76 communicates with the reference body 78, and via the conduit 80, normally open, solenoid operated valve 82, and conduit 72 with the other side of the interface unit 10, and serves to charge the entire system with gas under pressure. It will also be observed that the conduits 72 and 76 communicate respectively with the sensor 84. If desired, suitable pressure gauges 86 and 88 can be provided to indicate pressures in the systems at predetermined points.

By-pass conduit 90 provides communication for gas under pressure through the valve 92 with the pressure switch 52 noted earlier.

The apparatus described above is operated in a testing cycle as follows. The isolation valve 94 in conduit 76 is opened, charging the gas circuit system including the reference body 78 and the interface unit 10 with gas to a predetermined pressure. A commercial installation according to this invention contemplates the selective testing of vessels at a pressure of 425 p.s.i. or a pressure of 1100 p.s.i. Assuming that a test at 425 p.s.i. is to be conducted, the gas system is charged to a pressure of about ⅓ of test pressure. When the appropriate pressure is indicated on the gauge 88, the valve 94 is closed, isolating the gas system from the supply and maintaining a predetermined pressure therein.

The components of the gas charged system may be selected so that the volumes of the components on each side of the sensor 84 are substantially the same. That is, the valve 82 during the test will be closed, so that the portions of the gas system on opposite sides of the sensor will be isolated one from the other. The sensor which does not per se form a part of this invention is thus arranged to compare the gas pressures on its opposite sides. Generally considered, one side will include the reference body 78 while the other side includes the interface unit 10. Any sensor capable of detecting small flows, or pressure, or quantity changes in a gas system may be used. The sensor described in detail in co-pending application Ser. No. 753,944, filed Aug. 20, 1968 in the name of Wainwright Tuttle may be used advantageously.

The valve 92 may be opened to charge one side of the pressure switch 52 (a gas charged, differential pressure switch) with the predetermined test pressure, in this instance 425 p.s.i., to provide a sensitive, adjustable high pressure switch.

The vessel to be tested is then inserted in the liquid circuit system, and substantially filled with liquid under pressure. This is accomplished by first opening the normally closed vent valve 16, energizing the pump 22 by a suitable motor, and opening the main water valve 38. The output of the pump 22 will pass via the conduits 24 and 28 respectively to the booster 26 and check valve 30. The output from the booster goes via the conduits 40 and 44 respectively to the spring biased check valve 42 and the needle valve 46. During the initial filling of the test vessel when the back pressure on the check valve 30 is low, the entire volumetric output of the pump 22 will pass through the conduit 36, valve 38, and conduit 48 into the test vessel. This will effect a rapid filling of the vessel 12 with liquid.

During this initial filling, the greater bulk of the air in the test vessel is exhausted via the conduit 14 and now opened valve 16. However, once the vessel is substantially filled, a portion of the water will begin to leave the test vessel via the vent 14 and valve 16. The capacity of the vent 14 is substantially smaller than the input to the test vessel through the conduit 48. Hence, as more liquid is introduced through the conduit 48 than is vented through the conduit 14, the pressure in the system is increased. When the pressure reaches approximately 100 p.s.i. (an arbitrarily chosen figure which is high enough to insure that substantially all water is passing through the vent 14) the pressure switch 54 will be actuated, which is operative to close the vent valve 16. Thus, the continued forcing of liquid into the test vessel results in a rapid increase in pressure in the liquid circuit system.

By this time, the back pressure in the conduit 34 will be sufficient that the output of the pump cannot get through the check valve 30, and the entire output of the pump must pass through the high pressure booster 26. The output of booster is still passing through both the spring biased check valve 42 and the needle valve 46.

As just indicated, the liquid pressure in the system is now increasing very rapidly. Since it is very important (as described later) that the liquid pressure in the system be brought to precisely the predetermined test pressure, means should be provided for greatly decreasing the rate of pressure build-up at or near the predetermined test pressure so that the pressure at the sensing element at the pressure switch will be at the same pressure as the rest of the system, and to reduce inertia effects in the liquid and in the pressure switch mechanism. To this end, the pressure switches 56 and 58 will be selectively operable to open the normally closed separation valve 68. In the commercial embodiment briefly noted above, the pressure switch 56 may be set to operate at approximately 410 p.s.i., while pressure switch 58 will be set to operate at approximately 1050 p.s.i.

It will be recalled that one side of the interface unit 10 has already been charged with gas under pressure. Opening of the valve 68 brings the liquid circuit system into communication with the other side of the interface unit via the conduit 70. By virtue of the elastomer in the interface unit, the pressures in the gas and liquid systems will equalize. Since the liquid is substantially non-compressible while the gas in the gas circuit system is readily compressible, any pressure change in the liquid circuit system will be large, in comparison with the resulting change in pressure in the gas circuit system.

During a continuous testing process, the controls described later will close separation valve 68 and open vent valve 16 upon expiration of the test time. Thus, liquid at substantially full test pressure will be trapped in the portion of the liquid circuit between the valve 68 and interface unit 10. In an exemplary test at 425 p.s.i., the valve 68 will be opened at approximately 410 p.s.i. Pressure in the gas system and between the valve 68 and interface unit 10 will drop from 425 p.s.i. (previous test pressure) to approximately 424 p.s.i., while the pressure of the liquid in conduit 50 will jump from 410 p.s.i. to 424 p.s.i.

The only time an appreciable change in pressure in the gas circuit system and liquid circuit system between the valve 68 and interface unit 10 occurs is when a vessel with a leak has been tested. The action described above is important to permit restoration of exact test pressure on opposite sides of the interface unit 10. Otherwise, there would be a progressive change in pressure in the gas circuit system and in the portion of the liquid circuit system between the valve 68 and interface unit 10 which would produce an error due to the thermal effect of appreciable compression or expansion of the gas in the gas circuit system.

The main water valve (liquid system isolation valve) 38 is still open, so the output of the high pressure booster 26 is still effective to force liquid into the test vessel. By this time, the back pressure in the conduit 36 has been sufficient to close the check valve 42, so that the quantity of fluid introduced into the test vessel is controlled by the needle valve 46. Continued operation of the booster 26 will force liquid into the test vessel and into one side of the interface unit 10 until both the gas circuit system and the liquid circuit system have been brought to precisely the predetermined test pressure. At this point, the pressure switch 52 will be actuated to close the main water valve 38.

At this point, it will be apparent that both the gas circuit system and the liquid circuit system have been isolated from their respective supplies with the test pressure maintained therein. After a short delay to permit conditions in all systems to reach equilibrium, the valve 82 will be closed, separating the two portions of the gas system on opposite sides of the sensor.

At this point, the following conditions exist. On one side of the interface unit 10 is a liquid circuit system including the vessel being tested, substantially filled with liquid to a predetermined test pressure. On the other side of the interface unit is a gas charged system separated into two components by a sensor.

Should the vessel being tested show a leak, it will be reflected by a decrease in volume of liquid in the liquid circuit system. This decrease in volume will be transmitted via the elastomer in the interface unit 10 to that portion of the gas circuit system to the right of the sensor 84. As already indicated, the gas circuit system includes a sensor which senses a flow or compares the pressures or quantities in the two isolated halves of the gas system. A flow or a decrease in pressure or quantity in that portion of the gas system communicating with the interface unit will cause the sensor to generate an appropriate signal, indicating the presence of a leak in the vessel being tested.

All of the individual components described in the foregoing embodiment are conventional. One embodiment of an electrical control system for operating the arrangement described above is schematically shown in the straight line wiring diagram of FIGURE 2. The lines 100 and 102 will be connected to a suitable source of electric current. The circuit includes the push button master start switch 104, which is linked to the emergency stop switch 106. Actuation of the switch 104 will energize the entire circuit as indicated, and begin operation of the motor 108 which serves to drive the pump 22.

Once a vessel to be tested has been securely placed in the liquid circuit system, the test cycle is begun by actuation of the serially arranged start buttons 110 and 112. Making contact with both switches will energize the main relay CR1 through the normally made contacts indicated in the diagram. It should also be noted that making the contact with switch 110 will momentarily break contact 110a indicated in the diagram.

Energizing the relay CR1 will make relay contacts 114, 116, 118, and 120, and will break contacts 122 and 124.

Initial actuation of the switch 104 will, via the normally made contacts 54a of pressure switch 54 energize the solenoid 16a of vent valve 16, opening the valve. Making the contact 120 upon energization of the main relay CR1 will energize the solenoid 38a of main water valve 38, thus beginning the filling cycle.

Making the contact 116 which occurs upon energization of main relay CR1 will energize the charge timer TR1 which will be referred to again shortly. Making these contacts 116 will provide a communication via the connection 126 to 128 with the contacts 56a and 58a respectively of the pressure switches 56 and 58. The toggle switch 130 is set depending upon the test pressure desired, and in the position indicated will establish a circuit through the contact 56a for a test at 425 p.s.i.

When the preset pressure of switch 56 is reached, the contact 56a will be made, establishing a connection through the made contact seen in the diagram to energize solenoid 68a of valve 68, opening the valve and establishing communication between the liquid circuit system and the interface unit 10.

In accordance with the foregoing description, the pressure in the liquid and gas circuit systems will continue to increase very slowly until the precise predetermined test pressure is reached, at which point pressure switch 52 will be actuated making contacts 54 and energizing the full charge relay CR2. Energization of the full charge relay CR2 will make the contacts 132 to seal in the relay. This relay will also break the normally made contacts 34 to de-energize solenoid 38a and close the main water valve 38, and will break the normally made contacts 136.

The charge timer relay TR1 noted earlier will be set at a time sufficient to permit the full charging of the test vessel as outlined above, plus an additional amount of time to permit all systems to reach equilibrium. When the charge timer TR1 fires, it will break the normally made contacts 138, and will make the normally broken contacts 140 and 142. Making the contacts 140 will energize the test timer TR2 and the solenoid 82a of normally opened by-pass valve 82. This serves, as indicated earlier, to separate the gas system into two separate portions on either side of the sensor 84.

Firing of the charge timer TR1 also makes the normally broken contacts 144 to energize the indicator light 146 indicating that the "test" portion of the cycle has begun.

As indicated in the wiring diagram, the sensor 84 will be connected to an amplifier circuit indicated generally at 148. Thus, any flow or change in pressure or quantity in one portion of the gas system will cause the sensor to generate a signal which, via the amplifier 148 will serve to energize the relay CR3. Energization of this relay will make the normally broken contacts 150, thereby energizing the reject relay CR4. The relay CR3 also breaks the normally made contact 152, thereby de-energizing solenoid 68a and closing valve 68. The reject relay CR4 closes normally broken contacts 54 creating a circuit through indicator light 156 indicating the vessel being tested is a reject. Reject relay CR4 also makes normally broken contacts 158 to prevent automatic clearing, makes normally broken contacts 160 to seal in the relay CR4, and breaks normally made contacts 162 to prevent a circuit through indicator light 164 to be discussed presently.

The charge timer TR1 also makes the normally broken contacts 166 when it fires. If, by the time the charge timer fires, full pressure has not been reached, the normally made contact 136 (which would have been broken had full charge relay CR2 been energized) will establish a circuit through the no test relay CR5. This relay makes normally broken contacts 168 sealing in the relay, breaks normally made contacts 170 preventing a circuit through indicator light 164, and makes normally broken contacts 172 establishing a circuit through indicator light 174 which indicates "no test." This relay also makes normally broken contacts 175 to prevent automatic clearing of the circuit.

Assuming now that the sensor 84 has not detected a leak and hence has not energized reject relay CR4, and assuming that full pressure was reached before firing of the charge timer TR1 so that the breaking of contacts 136 prevents energization of the no test relay CR5, the test cycle will continue until the time set on the test timer TR2 has expired. Firing of the timer TR2 will break normally made contacts 176 preventing energization of the reject relay CR4, will break normally made contacts 178 causing the test indicator light 164 to show that the vessel being tested is acceptable.

Firing of the test timer TR2 also breaks normally made contacts 182 breaking the circuit through main relay CR1 and automatically clearing the device for the next test cycle. In the event that the reject relay CR4 or no test relay CR5 have been energized during the preceeding cycle, the corresponding normally broken contacts 158 and 175 will be closed, preventing automatic clearing of the device upon firing of the test timer TR2. In this case, the apparatus must be manually cleared by depressing the push button 184 which will de-energize main relay CR1.

It is believed that the foregoing constitutes a full and complete disclosure of one embodiment of the instant invention. It will be apparent that numerous modifications particularly in the electric circuitry are possible, and no limitations are to be inferred or implied from the foregoing detailed description.

The embodiments of the invention in which an exclusive property or privilege is claimed are defined as follows:

1. Apparatus for the non-destructive leak testing of a vessel comprising:
    (a) an interface unit;
    (b) a gas circuit system including a reference body and a sensing portion communicating with one side of said interface unit;
    (c) a liquid circuit system adapted to removably include a vessel to be tested and communicating with the other side of said interface unit;
    (d) means for charging said liquid circuit system including said vessel with liquid at a predetermined test pressure;
    (e) means for charging said gas circuit system with gas to said test pressure;
    (f) means for isolating said liquid circuit system while maintaining pressure therein;
    (g) means for isolating said gas circuit system while maintaining pressure therein; and
    (h) means for detecting a change of [state] volume in said sensing portion of said gas circuit system after both said gas circuit system and said liquid circuit system have been isolated by comparing the volumes in said reference body and said gas circuit system side of said interface unit.

2. The apparatus claimed in claim 1 wherein said interface unit includes an elastomer separating said gas circuit system from said liquid circuit system, whereby a change in quantity in said liquid circuit system is transmitted to said gas circuit system.

3. Apparatus for the non-destructive leak testing of a vessel comprising:
    (a) a sensing system including
        (i) a supply of gas under pressure;
        (ii) an interface unit;
        (iii) a reference body having a volume;
        (iv) conduit means for supplying said gas under pressure to both said interface unit and said reference body;
        (v) means for cutting off said interface unit from said supply while maintaining pressure therein; and
        (vi) sensor means for comparing the volumes in said reference body and said interface unit after said interface unit has been cut off from said supply; and
    (b) a liquid pressure system adapted to removably include said vessel to be tested, said liquid pressure system including
        (i) a supply of liquid under pressure;
        (ii) conduit means for delivering said liquid under pressure to said vessel;
        (iii) means for cutting off said vessel from said supply while maintaining pressure therein; and
        (iv) conduit means providing communication between said vessel and said interface unit.

4. Apparatus for non-destructive leak testing of a vessel comprising:
    (a) an interface unit including an elastomer;
    (b) a gas circuit system containing gas under pressure and communicating with said interface unit on one side of said elastomer;
    (c) a liquid circuit system adapted to removably include a vessel to be tested, said liquid circuit system including conduit means, providing communication with said interface unit on the other side of said elastomer, said conduit means including normally closed valve means between said vessel and said interface unit, means to substantially fill said vessel with liquid under pressure, means to isolate said vessel from said filling means when a predetermined test pressure has been attained, and means to open said normally closed valve at a preselected pressure in said liquid circuit system; and
    (d) sensing means associated with a portion of said gas circuit system for detecting a change in volume therein after said vessel has been isolated from said filling means.

5. The apparatus claimed in claim 4 wherein said filling means comprises:
    (a) a supply of liquid;
    (b) pump means operatively associated with said supply;
    (c) first conduit means providing communication between said pump and said vessel;
    (d) high pressure booster means operatively associated with said supply;
    (e) second conduit means providing communication between said high pressure booster and said vessel; and
    (f) valve means arranged to close said first conduit and open said second conduit when said vessel is substantially filled with liquid.

6. The appartus claimed in claim 4 wherein said means to isolate said vessel from said filling means is operative only after said normally closed valve means has been opened.

7. The apparatus claimed in claim 6 wherein said means to isolate said vessel from said filling means comprises a main valve and a pressure switch for actuating said main valve.

8. Apparatus for non-destructive leak testing of a vessel comprising:
    (a) a gas circuit system including a reference body;
    (b) a liquid circuit system adapted to removably include a vessel to be tested and having means to substantially fill said vessel with liquid under pressure;
    (c) a hollow body;
    (d) first and second conduit means connecting respectively said gas circuit system and said liquid circuit system to said body;
    (e) elastomer means mounted in said body and separating said gas and liquid circuit systems, whereby a change in volume in said liquid circuit system will be transmitted to said gas circuit system; and
    (f) sensing means associated with a portion of said gas circuit system for detecting a change in volume therein by comparing the volumes in said reference body and the gas circuit system portion of said hollow body.

9. The apparatus claimed in claim 8 including normally closed valve means in said second conduit between said vessel and said body, and means to open said normally closed valve means at a preselected pressure of said liquid in said liquid circuit system.

10. The apparatus claimed in claim 8 including means to prevent communication between said vessel and said filling means when the liquid pressure in said vessel has reached a predetermined test pressure, normally closed valve means in said second conduit between said vessel and said body, and means to open said normally closed valve means at a preselected pressure of said liquid in said liquid circuit system, said preselected pressure being less than said predetermined test pressure, whereby continued operation of said filling means is effective to charge both said vessel and said gas circuit system to said predetermined test pressure.

11. The apparatus claimed in claim 8 wherein said filling means comprises:
 (a) a supply of liquid;
 (b) pump means operatively associated with said supply;
 (c) first conduit means providing communication between said pump and said vessel;
 (d) high pressure booster means operatively associated with said supply;
 (e) second conduit means providing communication between said high pressure booster and said vessel; and
 (f) valve means arranged to close said first conduit and open said second conduit when said vessel is substantially filled with liquid.

12. The apparatus claimed in claim 8 wherein said gas circuit system comprises:
 (a) a supply of gas under pressure;
 (b) conduit means for supplying said gas under pressure to both said reference body and said hollow body; and
 (c) means for cutting off said hollow body from said supply while maintaining pressure therein; and wherein said sensing means is arranged to compare the volumes in said reference body and the gas circuit system portion of said hollow body after said hollow body has been cut off from said supply.

13. The apparatus claimed in claim 8 including means to prevent communication between said vessel and said filling means when the liquid pressure in said vessel has reached a predetermined test pressure.

14. The apparatus claimed in claim 13 including means for charging said gas circuit system with gas to said predetermined test pressure.

15. The method of non-destructive testing of a vessel for leaks comprising the steps of:
 (a) substantially filling said vessel to be tested with liquid to a predetermined test pressure;
 (b) isolating said pressurized, substantially liquid filled vessel;
 (c) providing a closed, gas charged system having a reference body and a sensing portion communicating with an interface unit;
 (d) communicating a change of volume of liquid in said vessel to the sensing portion of said gas charged system through said interface unit; and
 (e) detecting a change in volume in said gas charged system by comparing the volumes in said reference body and said sensing portion.

16. The method claimed in claim 15 wherein said step of substantially filling said vessel with liquid includes the steps of:
 (a) rapidly introducing liquid into said vessel to substantially fill it with liquid;
 (b) thereafter increasing the pressure of said liquid to an intermediate pressure slightly less than said predetermined test pressure;
 (c) equalizing the pressure in said vessel and the pressure in said closed gas charged system; and
 (d) thereafter further increasing the pressure of said liquid in said vessel to bring both said pressure in said vessel and said pressure in said closed gas system to said predetermined test pressure.

References Cited

UNITED STATES PATENTS

| | | | |
|---|---|---|---|
| 2,531,607 | 11/1950 | Bryant | 73—40 |
| 2,874,566 | 2/1959 | Mastak | 73—40 |
| 3,248,931 | 5/1966 | Berger et al. | 73—49.2 |

LOUIS R. PRINCE, Primary Examiner

WILLIAM A. HENRY, Assistant Examiner